United States Patent [19]

Schlotthauer

[11] Patent Number: 5,497,714
[45] Date of Patent: Mar. 12, 1996

[54] PLANTING HOLE DIGGER

[76] Inventor: James J. Schlotthauer, 1042 Ruge NW., Salem, Oreg. 97304

[21] Appl. No.: 272,802

[22] Filed: Jul. 11, 1994

[51] Int. Cl.$^6$ .................................................. A01C 11/02
[52] U.S. Cl. .................................. 111/106; 294/50.8
[58] Field of Search .................................. 111/106, 107, 111/92; 294/50.8, 50.9, 57, 60

[56] References Cited

U.S. PATENT DOCUMENTS

| | | | |
|---|---|---|---|
| 92,198 | 7/1869 | Lyman | 294/50.8 |
| 437,466 | 9/1890 | Vogel | 294/50.8 |
| 1,051,029 | 1/1913 | Stephanus | 294/50.8 |
| 1,761,503 | 6/1930 | Tönhardt | 294/50.8 |
| 3,638,741 | 2/1972 | Zizak | 175/215 |
| 4,807,710 | 2/1989 | Greeley | 175/394 |
| 4,986,373 | 1/1991 | Charland et al. | 175/21 |
| 5,080,027 | 1/1992 | Brothers | 111/99 |
| 5,133,269 | 6/1992 | Charneski | 111/106 |

FOREIGN PATENT DOCUMENTS

| | | | |
|---|---|---|---|
| 640139 | 4/1962 | Canada | 111/106 |
| 895525 | 1/1945 | France | 294/50.8 |
| 912492 | 8/1946 | France | 111/92 |
| 1019191 | 1/1953 | France | 111/106 |
| 10504 | 1/1909 | United Kingdom | 294/50.8 |
| 2086702 | 5/1982 | United Kingdom | 111/106 |

*Primary Examiner*—Randolph A. Reese
*Assistant Examiner*—Spencer K. Warnick, IV
*Attorney, Agent, or Firm*—George W. Wasson

[57] ABSTRACT

A tool for digging a planting hole for planting a rooted plant in a garden or landscape area. The tool includes cutting edges that may be pressed into the planting area by a user standing in an upright position. The cutting edges are attached to handles that are movable to move the cutting edges together to grasp the material to be removed from the hole to create the planting hole.

11 Claims, 2 Drawing Sheets

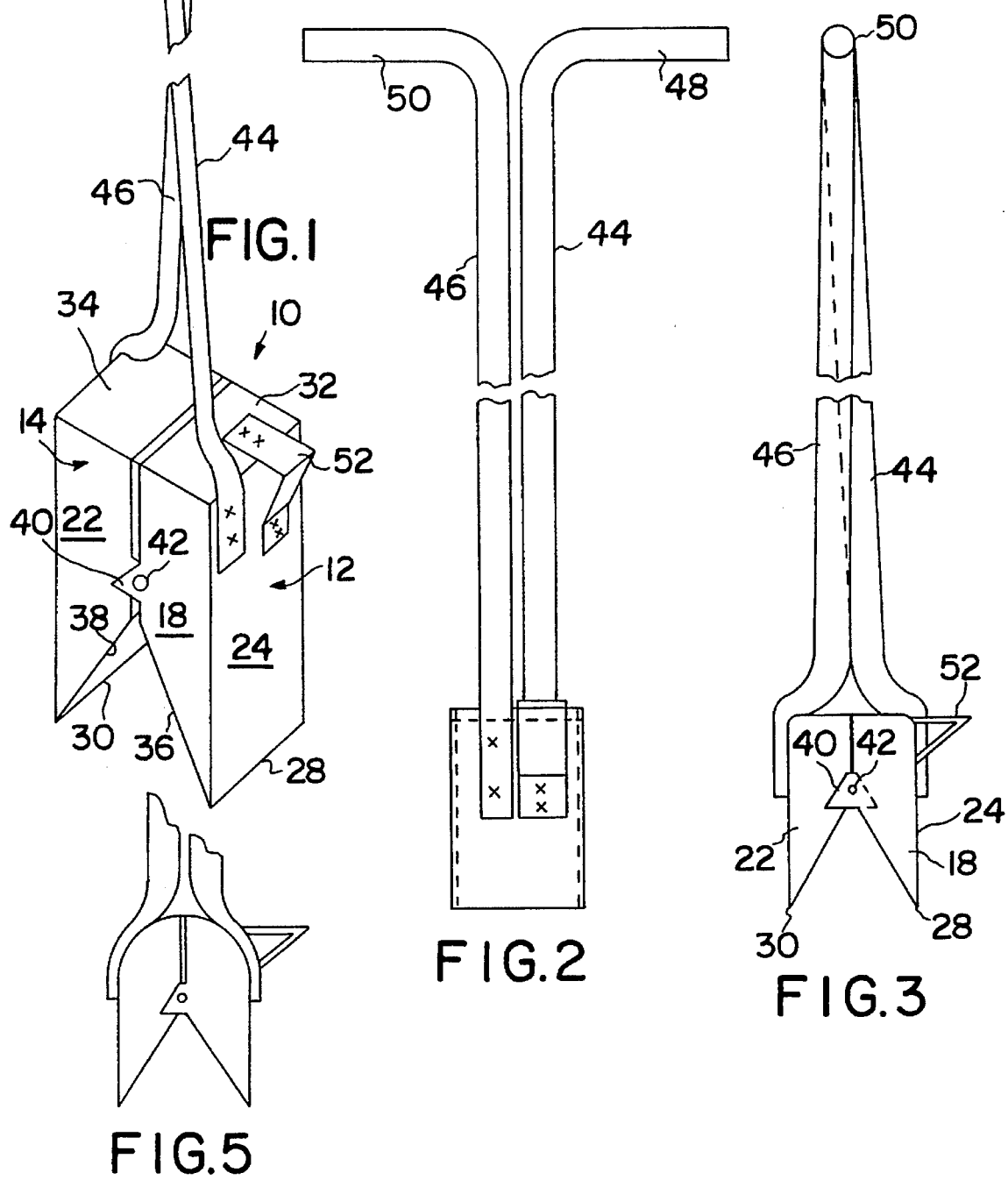

PLANTING HOLE DIGGER

This invention relates to a tool for digging holes for planting rooted plants and more particularly to a tool designed to dig a hole substantially the size of the usual nursery plant known as a "pony pack".

BACKGROUND OF THE INVENTION

The plant nursery business has standardized on rooted plant containers to the extent that most rooted plants may be purchased in plastic containers that have been used to grow the plant from a seedling or cutting to a commercial size for retail sales. Most purchasers of such rooted plants are faced with the need to dig a hole in their landscape or garden area into which the rooted plant is to be planted. For most such purchasers, there is a need to get into a kneeling position to dig such a planting hole. While a shovel can be used for the digging of the hole, the usual shovel is not the size of the standard plant container. There is a need for a tool that can be used to dig the hole that is very close to or exactly the size of the plant container so that, when the hole is dug, the rooted plant may be placed into the hole in a condition to continue its growing in the new garden soil.

SUMMARY OF THE INVENTION

The present invention is a planting hole digger that permits the user to dig a hole in an earth medium from a standing position. The tool is designed to be substantially the size of the container in which the rooted plant was purchased or grown so that the plant may be removed for the container and easily placed directly into a hole that substantially duplicates the container. The tool is designed to be pressed into the earth medium by placing a part of the user's weight on a portion of the tool to force cutting edges of the tool into the earth medium. The cutting edges of the tool are adapted to be hinged about aligned pivots so as to be movable toward each other to grasp a portion of the earth medium. The tool has upright handles that are attached to the cutting edges and are rotatable about the axis of the pivots of the cutting edges; movement of the handles moves the cutting edges to grasp the portion of the earth medium. The tool may then be lifted by the handles to remove the grasped portion of earth medium for removal thus greating the desired planting hole for the rooted plant. The removed earth portion may then be discarded or placed in another location and the rooted plant may be placed into the planting hole. Further treatment of the now planted plant may include spreading a portion of the removed earth portion around the plant, pressing the plant into its new location and watering or other treatment as needed. The digging of the planting hole has been accomplished without kneeling and, aside from the placing of the rooted plant into the planting hole, the entire procedure may be accomplished by the user from a standing position relieving the user of possible back strain.

An object of the present invention is a hand operable planting hole digging tool that may be used to remove a portion of a planting material, such as garden earth, to create a planting hole that is substantially the size of the root ball of a rooted plant grown in a plant container.

Another object of the present invention is accord with the preceeding object is a planting hole digger having hole digging cutting jaws that may be pressed into a planting medium with the jaws being hinged about an axis that will permit the jaws to be moved toward each other to grasp a portion of the planting medium for extraction from the medium to create the desired planting hole.

A further object of the present invention in accord with the preceeding objects is a planting hole digger that may be operated by a user from a standing position both in pressing the cutting jaws into the medium and extracting the grasped portion from the medium.

Further objects and features of the present invention will be readily apparent to those skilled in the art from the appended drawings and specification illustrating a preferred embodiment wherein:

BRIEF DESCRIPTION OF THE DRAWINGS

FIG. 1 is a perspective view of one form of the present invention.

FIG. 2 is a side elevational view of FIG. 1.

FIG. 3 is a front elevational view of FIG. 1.

FIG. 4 is a top plan view of FIG. 2.

FIG. 5 is an alternative form of the cutting jaws of the present invention

DESCRIPTION OF THE PREFERRED EMBODIMENTS

Figure 6:
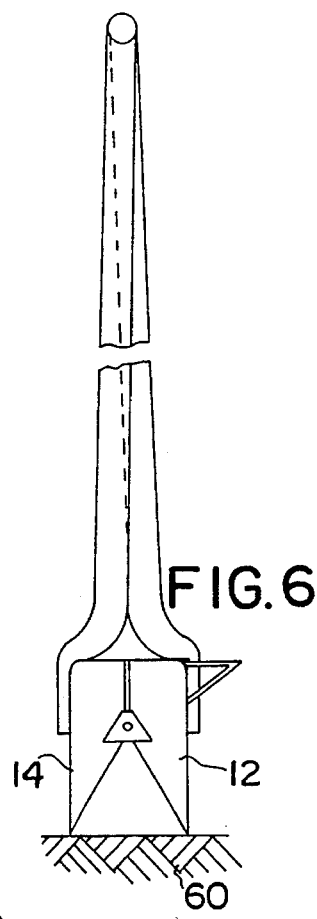
FIGS. 6, 7 and 8 are sequential step illustrations of the use to the present invention in operation.

As illustrated in FIG. 1, the planting hole digger 10 of the resent invention is in the form of a pair of complementary cutting jaws 12 and 14. The Jigger may be formed of metal or other rigid materials that will permit the portions of the tool to be formed or bent and will permit the elements of the tool to be joined as will be described. The jaws 12 and 14 are generally U-shaped in cross-section with matching legs 16, 18, 20 and 22 and with a bight portion 24 between the legs 16 and 18 and a bight portion 26 between the legs 20 and 22. The legs and bight portion of each of the jaws 12 and 14 form the cutting end 28 and 30, respectively, of the two jaws and the legs and bight portions form the central portion of the tool. At the top end, away from the cutting ends 28 and 30, a top portion extension 32 and 34 from the bight portion respectively, encloses the cutting jaws portion of the tool. The matching legs 16, 18, 20 and 22 have tapered edges 36 and 38 extending from the cutting ends 28 and 30 toward the top portions 32 and 34 of the jaws; only two of the tapered edges are shown but it should be understood that similar tapered edges are formed at each side of the tool 10. Each of the legs 16, 18, 20 and 22 include flexible joining tabs 40 extending from the matching legs, and the tabs 40 have mating holes that accomodate hinge pins or bolts 42 that permit the jaws 12 and 14 to be moved with respect to each other about the hinge pins. The tabs 40 are flexible to permit alignment and accomodation of the pin or bolt 42 and to permit the jaws to be in contact when closed and the top portion extensions to be in contact when the tool is open. When assembled as the planting hole digging tool 10, the matching legs of each of the pair of cutting jaws 12 and 14 are parallel to each other and the abutting bight portions extend to the top portions.

Separate duplicate operating bars 44 and 46 for the jaws 12 and 14, respectively, are attached by suitable means, such as spot welding, glue or the like, to the jaws. As shown in drawings the operating bars are attached to the bight portions 24 and 26 of the jaws, but it should be understood that the attachment could be to one of the legs 16 or 18 that form the jaw 12 or 20 or 22 that form the jaw 14. The operating bars extend upwardly from the top portions of the jaws 12 and 14 away from the cutting ends 28 and 30. The formation of the operating bars 44 and 46 and their attachment to the jaw portions is such that the bars are preferably aligned above the pivot hinge at the tabs 40 and do not interfere with each other above the cutting jaws. The upper most ends of the operating bars 44 and 46 are bent outwardly with respect to each other so as to form parallel and complementary hand-hold portions 48 and 50, respectively.

At least one foot platform 52 is attached by suitable means such as spot welding or glue, to one of the jaw portions 12 or 14 so a to provide a surface that may be used to press the tool into a planting medium. Only one such foot platform is shown in the drawings, but in should be understood that a foot platform could be at either or both sides of the assembled tool.

FIG. 5 illustrates an alternative design of the formation of the cutting jaws 12 and 14 with the upper portion of the legs away from the cutting ends formed in a rounded manner so that the bight portions 24 and 26 and the top portions 32 and 34 form a continuous surface. The operating arms 44 and 46 and the foot platform 52 are attached in a similar manner to that described with respect to the form of the tool described in FIGS. 1–4.

Figure 7:
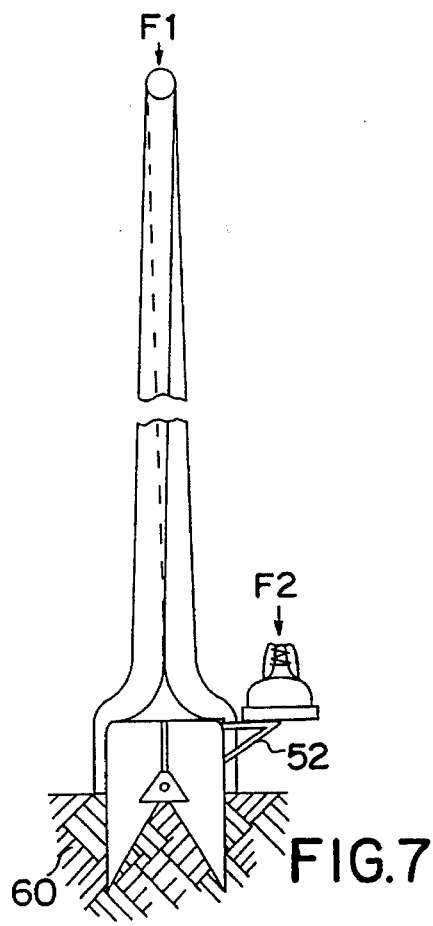
Figure 8:
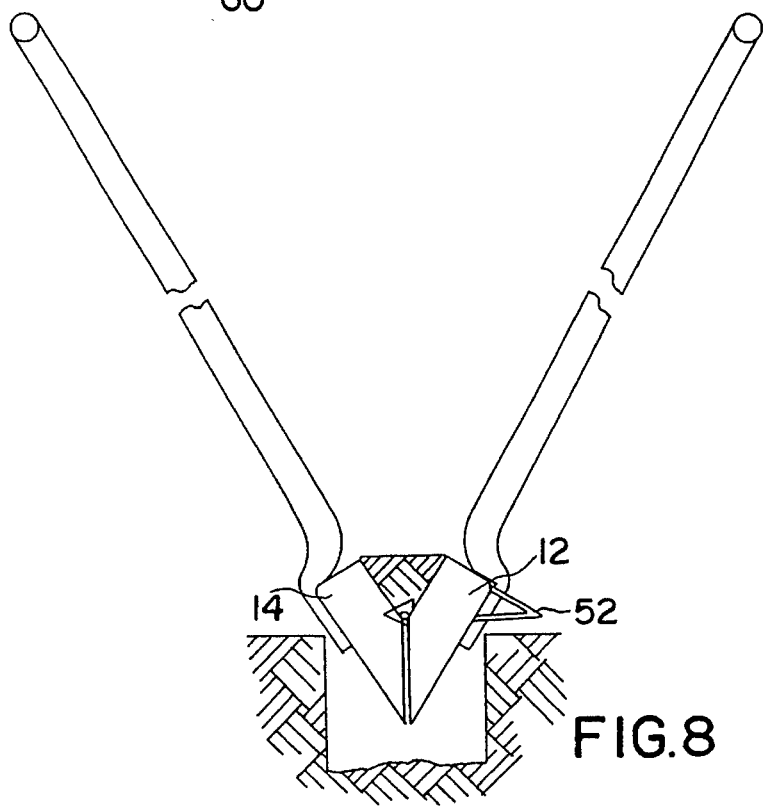

FIGS. 6, 7 and 8 illustrate the planting hole digging tool of the present invention in its use. The usual nursery rooted plant is sold in a container in which the plant has been grown to retail size; most frequently such containers are square and about four inches in side dimension and about four inches in depth. Rooted plants from such containers are ready for planting into a planting medium in a landscape or garden. Once the soil in the landscape or garden has been prepared for the actual planting of the plant, it is generally only necessary to produce a planting hole at the location where the rooted plant is to be planted. With the aid of the tool of the present invention, the planting hole may be produced by a user from a standing position.

The planting hole digger 10 of the present invention is sized to be used in producing the proper size of hole for the plant material to be planted. In the case of a four inch container of a rooted plant, the tool is sized to produce a planting hole of about the size of the four inch container. As shown in FIG. 6, The hole digger 10 is placed at the surface of the garden or landscape earth material 60 where the container plant is to be planted. As shown in FIG. 7, a force shown as F1 may be applied to the operating bars 44 and 46 at the hand hold portions 48 and 50 or the foot of the user may be pressed on the foot platform 52 if needed to apply a force F2 to press the tool into the earth material 60 to a desired depth. The depth of the penetration of the cutting ends 28 and 30 into the earth material 60 may be determined by the desired depth for planting of the rooted plant or by the limit of the engagement of the foot platform with the surface of the earth material. Once the desired depth has been attained as illustrated in FIG. 7, the hand hold portions 48 and 50 are rotated from their alignment with respect to each other above the tool to cause the cutting jaws 12 and 14 to be moved toward each other about the pivot of hinge pin 42 as shown in FIG. 8 to enclose the earth material that was between the jaws and to capture that material within the closed jaws of the tool. The tool 10 may them be removed from the earth material leaving behind a planting hole for the rooted plant. While not shown herein, it should be understood that the rooted plant may then be placed in the hole and treated as necessary to incorporate the plant into the landscape or garden. The material removed by the tool may be spread around the plant or the landscape as needed.

While a planting hole digging tool has been illustrated in the drawing of this disclosure as having a square configuration, it should be understood that the cross-section of the tool could be rectangular or circular to produce any desired size or shape of planting hole. The tool need not have a top portion 32 or 34 as it could be open at the top to produce a planting hole of deeper or lesser depth. Preferably, the pair of cutting jaws 12 and 14 are completely complementary so that as they are formed they can be assembled into the planting hole digger without concern for left or right side. As shown in FIG. 4 the two cutting jaws are mounted together with the joining tabs 40 in matching alignment to accomodate the hinge pin 42 for assembly of the parts as the completed tool 10.

While certain preferred embodiments of the present invention have been specifically disclosed, it should be understood that the invention is not limited thereto as many variations will be readily apparent to those skilled in the art and the invention is to be given the broadest possible interpertation within the terms of the following claims.

I claim:

1. A planting hole digger for cutting through earth and for removing earth to produce a planting hole in said earth, said digger comprising:

A) a pair of cutting jaws,
   a) said jaws having a generally U-shaped cross-section with matching legs and a bight portion between said matching legs, said jaws having a cutting end, a central portion, and a top portion, an extension from said bight portion at said top portion, said extension being bent with respect to said bight portion to align said bight extension with said matching legs adjacent to said top portion,
   b) said cutting end having tapered edges along the legs of said U-shape extending from said central portion toward said cutting end,
   c) means joining said cutting jaws at said central portion, said joining means permitting movement of said cutting jaws about said joining means,
   d) said matching legs being formed from said central portion to said top portion with parallel sides along said matching legs, B) separate duplicate operating bars attached to said cutting jaws,
   a) one of said duplicate operating bars being attached to each of said cutting jaws,
   b) said operating bars extending from said central portion of said cutting jaws, toward said top end and away from said cutting end,
   c) said operating bars being attached to said bight portion so as to move in non-conflicting planes with respect to each other,, C) and a foot platform on at least one of said cutting jaws, D) said planting hole digger being adapted to be hand held by said operating bars to be pressed in to an earth area so as to force said cutting jaws into said earth, said matching legs of said cutting jaws at said cutting end being adapted to be closed toward each other about said joining means by movement of said operating bars with respect to each other to close said cutting end about a removable portion of said earth, and said digger being adapted to be movable away from said earth while enclosing said removable portion to create a planting hole in said earth.

2. The planting hole digger of claim 1 wherein said central portion of said cutting jaws includes joining tabs extending from said said matching leg portions and away from said bight portion, said joining tabs being adapted to accomodate said joining means and to permit movement of said cutting jaws with respect to each other.

3. The planting hole digger of claim 2 wherein said tabs are flexible with respect to said leg portions so as to permit the ends of said matching legs on said jaws to contact each other as said cutting ends are in closed position and the ends of said bight extensions contact each other as said cutting ends are in open position.

4. The planting hole digger of claim 1 wherein said operating bars include outwardly bent portions at the ends thereof away from said cutting jaws, said outwardly bent portions being adapted to be hand held by a user.

5. The planting hole digger of claim 4 wherein said operating bars are attached to said bight portion.

6. The planting hole digger of claim 4 wherein each of said operating bars is attached to one of said matching legs with and operating bar at each side of said digger.

7. The planting hole digger of claim 1 wherein said bight portion of said cutting jaws is a substantially flat plane from said cutting end to said top portion, and said cutting jaws are forced into said earth in use with said bight portions substantially parallel with each other.

8. The planting hole digger of claim 1 wherein said foot platform is attached to said cutting jaws at said bight portion.

9. The planting hole digger of claim 1 wherein said foot platform is attached to one leg of one of said cutting jaws.

10. The planting hole digger of claim 1 wherein each of said cutting jaws has a foot platform attached to it.

11. The planting hole digger of claim 1 wherein said cutting jaws are pressed into said earth area by pressure on said foot platform.

* * * * *